US012679935B2

(12) United States Patent
Jean-Baptiste-Dit-Dominique et al.

(10) Patent No.: US 12,679,935 B2
(45) Date of Patent: Jul. 14, 2026

(54) MASTERBATCH BASED ON A MODIFIED POLYMER AND AN ORGANOPHOSPHORUS ADDITIVE, AND METHOD FOR MANUFACTURING SAME

(71) Applicant: COMPAGNIE GENERALE DES ETABLISSEMENTS MICHELIN, Clermont-Ferrand (FR)

(72) Inventors: Francois Jean-Baptiste-Dit-Dominique, Clermont-Ferrand (FR); Nathalie Coste, Clermont-Ferrand (FR); Adeline Jasselin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 660 days.

(21) Appl. No.: 17/788,885

(22) PCT Filed: Dec. 14, 2020

(86) PCT No.: PCT/FR2020/052418
§ 371 (c)(1),
(2) Date: Jun. 24, 2022

(87) PCT Pub. No.: WO2021/130429
PCT Pub. Date: Jul. 1, 2021

(65) Prior Publication Data

US 2023/0044213 A1 Feb. 9, 2023

(30) Foreign Application Priority Data

Dec. 24, 2019 (FR) ...................................... 1915578

(51) Int. Cl.
*C08J 3/22* (2006.01)
*B60C 1/00* (2006.01)
*C08K 5/5397* (2006.01)

(52) U.S. Cl.
CPC ............. *C08J 3/226* (2013.01); *B60C 1/0016* (2013.01); *C08K 5/5397* (2013.01); *C08J 2300/26* (2013.01); *C08J 2307/00* (2013.01); *C08J 2309/00* (2013.01); *C08J 2400/26* (2013.01); *C08J 2407/00* (2013.01); *C08J 2409/00* (2013.01)

(58) Field of Classification Search
CPC .... C08J 3/226; C08J 2300/26; C08J 2307/00; C08J 2309/00; C08J 2400/26; C08J 2407/00; C08J 2409/00; C08J 3/24; B60C 1/0016; C08K 5/5397; C08K 5/51; C08C 19/22; C08F 236/10
See application file for complete search history.

(56) References Cited

U.S. PATENT DOCUMENTS

| | | | | |
|---|---|---|---|---|
| 7,199,175 | B2 | 4/2007 | Vasseur | |
| 7,250,463 | B2 | 7/2007 | Durel et al. | |
| 7,900,667 | B2 | 3/2011 | Vasseur | |
| 10,202,471 | B2 | 2/2019 | Ugolnikov et al. | |
| 10,392,448 | B2 | 8/2019 | Salit | |
| 10,711,071 | B2 | 7/2020 | Jean-Baptiste-Dit-Dominique et al. | |
| 10,787,471 | B2 | 9/2020 | Ivanov et al. | |
| 11,034,780 | B2 | 6/2021 | Ugolnikov et al. | |
| 11,241,370 | B2 | 2/2022 | Valero et al. | |
| 2002/0147266 | A1* | 10/2002 | Rawlinson | C08L 21/00 524/565 |
| 2003/0212185 | A1 | 11/2003 | Vasseur | |
| 2005/0004297 | A1 | 1/2005 | Durel et al. | |
| 2005/0032965 | A1 | 2/2005 | Valero | |
| 2007/0112120 | A1 | 5/2007 | Vasseur | |
| 2010/0221541 | A1 | 9/2010 | Valero et al. | |
| 2011/0263784 | A1 | 10/2011 | Valero et al. | |
| 2012/0046418 | A1 | 2/2012 | Seo et al. | |
| 2013/0123418 | A1* | 5/2013 | Araujo Da Silva | C08L 9/06 264/175 |
| 2016/0251456 | A1 | 9/2016 | Ugolnikov et al. | |
| 2017/0073434 | A1 | 3/2017 | Salit | |
| 2018/0194787 | A1 | 7/2018 | Ivanov et al. | |
| 2019/0048102 | A1 | 2/2019 | Jean-Baptiste-Dit-Dominique et al. | |

(Continued)

FOREIGN PATENT DOCUMENTS

| | | | |
|---|---|---|---|
| FR | 3038607 | A1 | 1/2017 |
| FR | 3060571 | A1 | 6/2018 |

(Continued)

OTHER PUBLICATIONS

Sigma-Aldrich, "Safety Data Sheet Tris(2-ethylhexyl) phosphate", 2024, Sigma Aldrich, 1-10 (Year: 2024).*

(Continued)

*Primary Examiner* — Robert S Jones, Jr.
*Assistant Examiner* — Joshua Caleb Bledsoe
(74) *Attorney, Agent, or Firm* — VENABLE LLP

(57) ABSTRACT

A process for manufacturing a masterbatch comprises the following steps: (a) bringing at least one initial polymer comprising at least one carbon-carbon unsaturation into contact with at least one 1,3-dipolar grafting agent bearing at least one nitrile oxide dipole in the presence of at least one organophosphorus additive selected from the group consisting of phosphoric acid triesters, phosphonates, phosphinates, phosphine oxides and the mixtures of these compounds, and (b) recovering the masterbatch obtained in the preceding step. The masterbatch and compositions containing it and also tires comprising such compositions are also disclosed.

16 Claims, No Drawings

(56) References Cited

U.S. PATENT DOCUMENTS

| | | | |
|---|---|---|---|
| 2019/0119412 | A1 | 4/2019 | Ugolnikov et al. |
| 2019/0315888 | A1 | 10/2019 | Said-Diatta |
| 2021/0171670 | A1 | 6/2021 | Salit et al. |
| 2024/0101797 | A1 | 3/2024 | Jasselin et al. |

FOREIGN PATENT DOCUMENTS

| | | | |
|---|---|---|---|
| WO | 02/10269 | A2 | 2/2002 |
| WO | 03/016215 | A1 | 2/2003 |
| WO | 03/016387 | A1 | 2/2003 |
| WO | 2015/059269 | A1 | 4/2015 |
| WO | 2015/177104 | A1 | 11/2015 |
| WO | 2015/177105 | A1 | 11/2015 |
| WO | 2017/009150 | A1 | 1/2017 |
| WO | 2017/121950 | A1 | 7/2017 |
| WO | 2019/102128 | A1 | 5/2019 |

OTHER PUBLICATIONS

International Search Report dated Apr. 12, 2021, in corresponding PCT/FR2020/052418 (4 pages).
S. Brunauer, et al., "Adsorption of Gases in Multimolecular Layers", J. Am. Chem. Soc., vol. 60, pp. 309-319 (1938).
G.P. Moss, et al., "Glossary of Class Names of Organic Compounds and Reactive Intermediates Based on Structure", IUPAC, Pure & Appl. Chem., vol. 67, Nos. 8/9, pp. 1307-1375 (1995).
A.D. Jenkins, et al., "Glossary of Basic Terms in Polymer Science", IUPAC, Pure & Apl. Chem., vol. 68, No. 12, pp. 2287-2311 (1996).

* cited by examiner

MASTERBATCH BASED ON A MODIFIED POLYMER AND AN ORGANOPHOSPHORUS ADDITIVE, AND METHOD FOR MANUFACTURING SAME

1—FIELD OF THE INVENTION

The field of the invention is that of polymer-based masterbatches, the processes for manufacturing same and the uses thereof in compositions, in particular in rubber compositions intended notably for the manufacture of pneumatic or non-pneumatic tyres.

2—TECHNICAL BACKGROUND

Modifying the chemical structure of a polymer generally impacts the chemical and physical properties thereof, and also the properties of the compositions containing it. This structural modification may especially be carried out by introducing chemical functions using a grafting agent. The functions introduced may, for example, improve the dispersion of a reinforcing filler in the elastomer matrix and thus make it possible to obtain a more homogeneous material.

As a polymer grafting agent, mention may be made, for example, of the use of 1,3-dipolar compounds bearing a nitrile oxide dipole. The modification of a polymer by compounds of this type is known and takes place via a [3+2] cycloaddition reaction of the 1,3-dipolar grafting agent with a carbon-carbon unsaturation of the monomers of the polymer. Very often, this grafting agent is a compound having another chemical function different from that of the nitrile oxide dipole, said other function imparting novel properties to the polymer. These 1,3-dipolar grafting agents thus make it possible to graft pendent chemical functions onto the polymer and make it possible to obtain a modified or functionalized polymer.

Documents WO2015177105, US20120046418, WO2019102128 describe a reaction for modifying a diene elastomer with a 1,3-dipolar grafting agent via a bulk process in an internal mixer. More specifically, the diene elastomer and the 1,3-dipolar grafting agent are introduced into an internal mixer in which thermomechanical kneading is carried out, then the mixture obtained undergoes a heat treatment step at 120° C. for a few minutes, in order to obtain a good grafting yield of said 1,3-dipolar grafting agent on said diene elastomer. However, this heat treatment step gives rise to an additional cost in an industrial process linked to this additional step.

Furthermore, when the diene elastomer is a natural rubber, the grafting yield of the 1,3-dipolar grafting agent is, with the process described above, lower than that obtained for synthetic elastomers. To overcome this problem, document WO2017121950 discloses the use of epoxidized natural rubber or performing a step of epoxidation of the natural rubber before the grafting reaction of the 1,3-dipolar grafting agent is carried out. This natural rubber epoxidation step also gives rise to an additional cost in an industrial process.

There is therefore a need to improve the process for modifying a polymer by grafting of a 1,3-dipolar grafting agent.

There is also a need to have a process for modifying a polymer with a 1,3-dipolar grafting agent which is simple to implement, that is to say requiring a limited number of reaction steps, and having an equivalent or even improved grafting yield compared to the processes of the prior art.

In addition, there is also a need to have a process for modifying a polymer with a 1,3-dipolar grafting agent which makes it possible to obtain improved grafting yields, regardless of the chemical nature of the polymer used as the starting reagent.

The aim of the present invention is to at least partially meet the aforementioned needs.

3—SUMMARY OF THE INVENTION

The applicant has developed a new process for preparing a polymer with a 1,3-dipolar grafting agent that is simpler to implement than the processes of the prior art and that makes it possible to obtain grafting yields that are significantly improved compared to the process of the prior art, regardless of the nature of the polymer, in particular a diene elastomer.

Surprisingly, the applicant has discovered that when a specific organophosphorus additive is used in a process for grafting a 1,3-dipolar grafting agent onto a polymer, the grafting of this compound can in particular be carried out without the heat treatment step and without the yield of the reaction being adversely affected, or even while significantly improving the grafting yield, and this being regardless of the chemical nature of the polymer, in particular the diene elastomer, notably when it is natural rubber or a synthetic polyisoprene.

Thus, one subject of the invention is at least one process for manufacturing a masterbatch, comprising the following steps:

(a) bringing at least one initial polymer comprising at least one carbon-carbon unsaturation into contact with at least one 1,3-dipolar grafting agent bearing at least one nitrile oxide dipole in the presence of at least one organophosphorus additive selected from the group consisting of phosphoric acid triesters, phosphonates, phosphinates, phosphine oxides and the mixtures of these compounds, (b) recovering the masterbatch obtained in the preceding step.

More particularly, the process for manufacturing a masterbatch according to the invention may advantageously exhibit at least one of the following preferred characteristics taken alone or in combinations.

Preferentially, the organophosphorus additive is brought into contact with the initial polymer before they are brought into contact with the 1,3-dipolar grafting agent.

Preferentially, the organophosphorus additive is brought into contact with the 1,3-dipolar grafting agent before they are brought into contact with the initial polymer.

Preferentially, the initial polymer, the 1,3-dipolar grafting agent and the organophosphorus additive are brought into contact simultaneously.

Preferentially, the contacting step (a) is carried out in bulk or in solution.

Preferentially, steps (a) and (b) are carried out at a temperature below or equal to 35° C.

Preferentially, the process further comprises at least one heat treatment step (a'), after the contacting step (a).

Preferentially, the heat treatment step (a') is carried out at a temperature above 35° C., preferably at a temperature above or equal to 36° C., more preferentially still at a temperature within a range of from 36° C. to 180° C., more preferentially ranging from 36° C. to 150° C.

Preferentially, the organophosphorus additive is selected from the group consisting of phosphoric acid triesters, phosphonates, phosphinates and the mixtures of these compounds.

Preferentially, the organophosphorus additive is selected from the group consisting of phosphoric acid triesters, phosphonates and the mixtures of these compounds.

Preferentially, the organophosphorus additive is selected from the group consisting of phosphoric acid triesters and the mixtures of these compounds.

Preferentially, the organophosphorus additive corresponds to the formula (I):

(I)

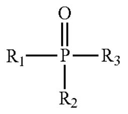

in which:

R1 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls;

R2 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls; and R3 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls.

Preferentially, the organophosphorus additive corresponds to the formula (I) in which:

R1 is selected from the group consisting of C1-C20 alkyls, C6-C20 aryls and O—Ra groups with Ra being a radical selected from the group consisting of C1-C20 alkyls and C6-C20 aryls;

R2 is selected from the group consisting of C1-C20 alkyls, C6-C20 aryls and O—Ra groups with Ra being a radical selected from the group consisting of C1-C20 alkyls and C6-C20 aryls; and R3 is selected from the group consisting of C1-C20 alkyls, C6-C20 aryls and O—Ra groups with Ra being a radical selected from the group consisting of C1-C20 alkyls and C6-C20 aryls.

Preferentially, the organophosphorus additive corresponds to the formula (Ia):

(Ia)

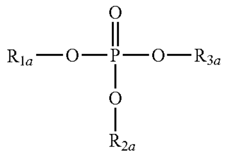

in which R1a, R2a, R3a, which may be identical or different, are selected from the group consisting of C1-C20 alkyls, C6-C20 aryls, (C1-C20)alkyl(C6-C20)aryls and (C6-C20) aryl(C1-C20)alkyls.

Preferentially, in the formula (Ia), R1a, R2a, R3a, which may be identical or different, are selected from the group consisting of C1-C12 alkyls, C6-C12 aryls, (C1-C12)alkyl (C6-C12)aryls and (C6-C12)aryl(C1-C12)alkyls.

Preferentially, in the formula (Ia), R1a, R2a, R3a, which may be identical or different, are selected from the group consisting of C1-C12 alkyls and C6-C12 aryls.

Preferentially, the organophosphorus additive is selected from the group consisting of tris(ethylhexyl) phosphate, 2-ethylhexyl diphenyl phosphate, tri-n-octyl phosphate, triisobutyl phosphate and mixtures thereof.

Preferentially, the initial polymer is an elastomer comprising at least one carbon-carbon unsaturation.

Preferentially, the initial polymer is a diene elastomer.

Preferentially, the initial polymer is selected from the group consisting of natural rubber, synthetic polyisoprenes, polybutadienes, isoprene copolymers, butadiene copolymers and the mixtures of these polymers.

Preferentially, the initial polymer is selected from the group consisting of natural rubber, synthetic polyisoprenes, isoprene copolymers, and the mixtures of these polymers.

Preferentially, the molar content of said 1,3-dipolar grafting agent is within a range of from 0.01 mol % to 10 mol %, preferably from 0.01 mol % to 5 mol %.

Preferentially, the organophosphorus additive is used at a content greater than or equal to 0.3 php; more preferentially greater than or equal to 0.4 php; more preferentially still greater than or equal to 0.5 php.

Preferentially, the organophosphorus additive is used at a content within a range of from 0.3 php to 20 php, preferably within a range of from 0.4 php to 10 php.

Preferentially, the 1,3-dipolar grafting agent comprises, in addition to the nitrile oxide dipole, at least one chemical function selected from the group consisting of optionally substituted nitrogen-containing or sulfur-containing heterocycles, esters, oxiranes, carbonates and tertiary amines.

Preferentially, the 1,3-dipolar grafting agent comprises, in addition to the nitrile oxide dipole, at least one chemical function selected from the group consisting of optionally substituted nitrogen-containing heterocycles, such as substituted or unsubstituted imidazoles or benzoimidazoles, oxiranes and carbonates.

Another subject of the present invention relates to a masterbatch that can be obtained by the process defined above.

Another subject of the present invention relates to a masterbatch based on at least one organophosphorus additive, on at least one initial polymer comprising at least one carbon-carbon unsaturation and at least one 1,3-dipolar grafting agent bearing at least one nitrile oxide dipole, said organophosphorus additive being selected from the group consisting of phosphoric acid triesters, phosphonates, phosphinates, phosphine oxides and the mixtures of these compounds.

Another subject of the present invention relates to a masterbatch comprising at least one organophosphorus additive and at least one polymer modified, in the presence of said organophosphorus additive, by at least one 1,3-dipolar grafting agent bearing at least one nitrile oxide dipole, said organophosphorus additive being selected from the group consisting of phosphoric acid triesters, phosphonates, phosphinates, phosphine oxides and the mixtures of these compounds.

More particularly, the masterbatch of the invention may advantageously exhibit at least one of the following preferred characteristics taken alone or in combinations.

Preferentially, the masterbatch has a phosphorus content of greater than 600 ppm, preferably ranging from 700 ppm to 55 000 ppm.

Preferentially, said organophosphorus additive is selected from the group consisting of phosphoric acid triesters, phosphonates, phosphinates and the mixtures of these compounds.

Preferentially, said organophosphorus additive is selected from the group consisting of phosphoric acid triesters, phosphonates and the mixtures of these compounds.

Preferentially, said organophosphorus additive is selected from the group consisting of phosphoric acid triesters and the mixtures of these compounds.

Preferentially, the organophosphorus additive corresponds to the formula (I):

(I)

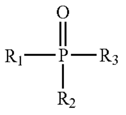

in which:

- R1 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20)aryls and (C6-C20)aryl(C1-C20) alkyls;
- R2 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20)aryls and (C6-C20)aryl(C1-C20) alkyls; and
- R3 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20)aryls and (C6-C20)aryl(C1-C20) alkyls.

Preferentially, the organophosphorus additive corresponds to the formula (I) in which:

- R1 is selected from the group consisting of C1-C20 alkyls, C6-C20 aryls and O—Ra groups with Ra being a radical selected from the group consisting of C1-C20 alkyls and C6-C20 aryls;
- R2 is selected from the group consisting of C1-C20 alkyls, C6-C20 aryls and O—Ra groups with Ra being a radical selected from the group consisting of C1-C20 alkyls and C6-C20 aryls; and
- R3 is selected from the group consisting of C1-C20 alkyls, C6-C20 aryls and O—Ra groups with Ra being a radical selected from the group consisting of C1-C20 alkyls and C6-C20 aryls.

Preferentially, the organophosphorus additive corresponds to the formula (Ia):

(Ia)

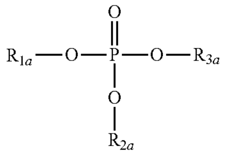

in which R1a, R2a, R3a, which may be identical or different, are selected from the group consisting of C1-C20 alkyls, C6-C20 aryls, (C1-C20)alkyl(C6-C20)aryls and (C6-C20) aryl(C1-C20)alkyls.

Preferentially, in the formula (Ia), R1a, R2a, R3a, which may be identical or different, are selected from the group consisting of C1-C12 alkyls, C6-C12 aryls, (C1-C12)alkyl (C6-C12)aryls and (C6-C12)aryl(C1-C12)alkyls.

Preferentially, in the formula (Ia), R1a, R2a, R3a, which may be identical or different, are selected from the group consisting of C1-C12 alkyls and C6-C12 aryls.

Preferentially, the organophosphorus additive is selected from the group consisting of tris(ethylhexyl) phosphate, 2-ethylhexyl diphenyl phosphate, tri-n-octyl phosphate, triisobutyl phosphate and mixtures thereof.

Preferentially, the modified polymer is a diene elastomer.

Preferentially, the modified polymer is selected from the group consisting of natural rubber, synthetic polyisoprenes, polybutadienes, isoprene copolymers, butadiene copolymers and the mixtures of these polymers.

Preferentially, the initial polymer is selected from the group consisting of natural rubber, synthetic polyisoprenes, isoprene copolymers, and the mixtures of these polymers.

Preferentially, the organophosphorus additive is used at a content greater than or equal to 0.3 php; more preferentially greater than or equal to 0.4 php; more preferentially still greater than or equal to 0.5 php.

Preferentially, the organophosphorus additive is used at a content within a range of from 0.3 php to 20 php, preferably within a range of from 0.4 php to 10 php.

Preferentially, the 1,3-dipolar grafting agent comprises, in addition to the nitrile oxide dipole, at least one chemical function selected from the group consisting of optionally substituted nitrogen-containing or sulfur-containing heterocycles, esters, oxiranes, carbonates and tertiary amines.

Preferentially, the 1,3-dipolar grafting agent comprises, in addition to the nitrile oxide dipole, at least one chemical function selected from the group consisting of optionally substituted nitrogen-containing heterocycles, such as substituted or unsubstituted imidazoles or benzoimidazoles, oxiranes and carbonates.

Preferentially, the polymer modified in the presence of said organophosphorus additive has a molar content of grafted 1,3-dipolar grafting agent greater than that of a modified polymer obtained under the same grafting conditions but without the presence of organo-phosphorous additive.

Another subject of the present invention relates to a composition based on at least one masterbatch defined above or capable of being obtained according to the process described above.

Preferentially, the composition further comprises at least one reinforcing filler and at least one crosslinking system.

Another subject of the present invention is a rubber article comprising at least one composition above.

Another subject of the present invention relates to a pneumatic or non-pneumatic tyre comprising at least one composition above.

4—DETAILED DESCRIPTION OF THE INVENTION

One subject of the invention is therefore a process for manufacturing a masterbatch, comprising the following steps:

(a) bringing at least one initial polymer comprising at least one carbon-carbon unsaturation into contact with at least one 1,3-dipolar grafting agent bearing at least one nitrile oxide dipole in the presence of at least one organophosphorus additive selected from the group consisting of phosphoric acid triesters, phosphonates, phosphinates, phosphine oxides and the mixtures of these compounds, (b) recovering the masterbatch obtained in the preceding step.

The term "masterbatch" is understood, for the purposes of the present invention, as meaning a composition which comprises at least one polymer mixed with one or more additives, said additive(s) being dispersed in the polymer, it being possible for said additive(s) to be for example a filler, which is optionally reinforcing, a plasticizer or any other type of additive. The masterbatch is a "primary" composition in the sense that two compounds of different chemical nature are mixed together a first time, this "primary" composition then being mixed (second mixing) with other ingredients to form a final composition, for instance a rubber composition intended for the manufacture of a tread. For example, to obtain a composition, notably a rubber composition, one or more additives are added to a masterbatch consisting of an elastomer and carbon black, such as for example a plasticizing oil, a crosslinking system, etc.

The masterbatch of the invention or capable of being obtained from the manufacturing process of the invention comprises at least one organophosphorus additive and at least one polymer that is modified, in the presence of said organophosphorus additive, by a 1,3-dipolar grafting agent bearing at least one nitrile oxide dipole and at least one chemical function.

Advantageously, the masterbatch of the invention or capable of being obtained from the manufacturing process of the invention consists essentially of (more preferentially still consists of) an organophosphorus additive and a polymer that is modified, in the presence of said organophosphorus additive, by a 1,3-dipolar grafting agent bearing at least one nitrile oxide dipole and at least one chemical function.

The expression "consists essentially of", followed by one or more characteristics, means that, besides the components or steps explicitly listed, components or steps which do not significantly modify the properties and the characteristics of the invention can be included in the process or the material of the invention.

The expression "$C_i$-$C_j$ alkyl" denotes a linear, branched or cyclic hydrocarbon group comprising from i to j carbon atoms; i and j being integers.

The expression "Ci-Cj aryl" denotes an aromatic group comprising from i to j carbon atoms; i and j being integers.

The expression "(Ci-Cj)alkyl(Ck-Cn)aryl" denotes an alkyl group comprising from i to j carbon atoms attached to the rest of the molecule by an aryl group comprising from k to n carbon atoms.

The expression "(Ci-Cj)aryl(Ck-Cn)alkyl" denotes an aryl group comprising from i to j carbon atoms attached to the rest of the molecule by an alkyl group comprising from k to n carbon atoms.

The carbon-comprising compounds mentioned in the description can be of fossil or biobased origin. In the latter case, they may be partially or completely derived from biomass or be obtained from renewable starting materials derived from biomass. They are in particular polymers, fillers, etc.

The expression "part by weight per hundred parts by weight of polymer" (or php) should be understood as meaning, for the purposes of the present invention, the part by mass per hundred parts by mass of polymer. When the polymer is an elastomer or a diene elastomer, reference will then be made to "phr", i.e. "part by weight per hundred parts by weight of elastomer (rubber), which should be understood as meaning, for the purposes of the present invention, the part by mass per hundred parts by mass of elastomer (rubber).

In the present text, unless expressly indicated otherwise, all the percentages (%) indicated are mass percentages (%).

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

The term "modified polymer obtained by grafting" or "polymer modified by grafting" or "polymer modified by a grafting agent" is understood to mean a polymer comprising chemical functions which have been introduced along the polymer chain via a grafting reaction of a grafting agent capable of grafting said chemical functions onto a chain of the polymer. In practice, the modified polymer is obtained by grafting reaction, when an initial polymer comprising at least one carbon-carbon unsaturation is brought into contact with at least one organophosphorus additive and at least one 1,3-dipolar grafting agent bearing at least one chemical function and bearing at least one nitrile oxide dipole, said nitrile oxide dipole being capable of forming a covalent bond with an unsaturation of the chain of the polymer. During the grafting reaction, the nitrile oxide dipole of the 1,3-dipolar grafting agent forms covalent bonds with the unsaturation(s) of the chain of the polymer. The modified polymer comprises the chemical functions borne by the 1,3-dipolar grafting agent which have been grafted onto its chain via the nitrile oxide dipole and which are randomly distributed along the chain.

As is known, a polymer generally comprises at least one main polymer chain. This polymer chain may be termed the main chain as long as all the other chains of the polymer are considered to be pendent chains, as mentioned in the document "Glossary of basic terms in polymer science" (IUPAC recommendations 1996), PAC, 1996, 68, 2287, page 2294.

The term "carbon-carbon unsaturation" is understood to mean a multiple covalent bond between two carbon atoms: this multiple covalent bond can be a carbon-carbon double bond or a carbon-carbon triple bond, preferably a carbon-carbon double bond.

The term "chain of the initial polymer" is understood, for the purposes of the present invention, to mean the chain of the polymer before the grafting reaction; this chain comprising at least one unsaturation, in particular carbon-carbon unsaturation, more preferentially at least two unsaturations, capable of reacting with the 1,3-dipolar grafting agent bearing at least one nitrile oxide dipole. The initial polymer is thus the polymer serving as the starting reagent during the grafting reaction. The grafting reaction makes it possible, starting with an initial polymer, to obtain a modified polymer.

Preferably, this initial polymer is an elastomer comprising at least one carbon-carbon unsaturation, more preferentially still is a diene elastomer.

"Diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". The term "essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15 mol %, of units of diene origin).

A diene elastomer capable of being used in the context of the present invention is understood in particular to mean:

- any homopolymer of a conjugated or non-conjugated diene monomer having from 4 to 18 carbon atoms;
- any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Non-conjugated dienes that are suitable include non-conjugated dienes having from 6 to 12 carbon atoms, such as 1,4-hexadiene, ethylidene norbornene or dicyclopentadiene.

Suitable as olefins are vinylaromatic compounds having from 8 to 20 carbon atoms and aliphatic α-monoolefins having from 3 to 12 carbon atoms.

Vinylaromatic compounds that are suitable include, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

More particularly, the diene elastomer can be:

- any homopolymer of a conjugated diene monomer, in particular any homopolymer obtained by polymerization of a conjugated diene monomer having from 4 to 12 carbon atoms;
- any copolymer obtained by copolymerization of one or more conjugated dienes with one another or with one or more vinylaromatic compounds having from 8 to 20 carbon atoms;
- a copolymer of isobutene and of isoprene (butyl rubber) and also the halogenated versions, in particular chlorinated or brominated versions, of this type of copolymer;
- any copolymer obtained by copolymerization of one or more conjugated or non-conjugated dienes with ethylene, an α-monoolefin or a mixture thereof, such as, for example, the elastomers obtained from ethylene, from propylene with a non-conjugated diene monomer of the abovementioned type.

Preferentially, the initial polymer is preferably a diene elastomer selected from the group consisting of ethylene/propylene/diene monomer (EPDM) copolymers, butyl rubber (IRR), natural rubber (NR), synthetic polyisoprenes (IRs), polybutadienes (BRs), butadiene copolymers, isoprene copolymers and mixtures of these elastomers.

Preferentially, the initial polymer is preferably a diene elastomer selected from the group consisting of ethylene/propylene/diene monomer (EPDM) copolymers, butyl rubber (IRR), natural rubber (NR), synthetic polyisoprenes (IRs), polybutadienes (BRs), butadiene/styrene copolymers (SBRs), ethylene/butadiene copolymers (EBRs), ethylene/isoprene copolymers (EIRs), isoprene/butadiene copolymers (BIRs) or isoprene/butadiene/styrene copolymers (SBIRs), isobutene/isoprene copolymers (butyl rubber-IIR), isoprene/styrene copolymers (SIRs), and mixtures of these elastomers.

Preferentially, the initial polymer is preferably a diene elastomer selected from the group consisting of ethylene/propylene/diene monomer copolymers, butyl rubber, and the mixture of these rubbers.

Preferentially, the initial polymer is preferably a diene elastomer selected from the group consisting of natural rubber, synthetic polyisoprenes, polybutadienes, butadiene copolymers, isoprene copolymers and mixtures of these elastomers.

More preferentially, the initial polymer is preferably a diene elastomer selected from the group consisting of natural rubber, synthetic polyisoprenes, polybutadienes, butadiene/styrene copolymers, ethylene/butadiene copolymers, ethylene/isoprene copolymers, isoprene/butadiene copolymers, isoprene/butadiene/styrene copolymers, isobutene/isoprene copolymers, isoprene/styrene copolymers, and mixtures of these elastomers.

Preferentially, the initial polymer is preferably a diene elastomer selected from the group consisting of polybutadienes, butadiene copolymers, isoprene copolymers and mixtures of these elastomers.

More preferentially, the initial polymer is a diene elastomer selected from the group consisting of polybutadienes, butadiene/styrene copolymers, ethylene/butadiene copolymers, isoprene/butadiene copolymers, isoprene/butadiene/styrene copolymers, isobutene/isoprene copolymers, isoprene/styrene copolymers, and mixtures of these elastomers.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418-08)) of between 0° C. and −90° C. and more particularly between −10° C. and −70° C., a styrene content of between 1% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2- plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

Preferentially, the initial polymer is preferably a diene elastomer and is selected from the group consisting of natural rubber, synthetic polyisoprenes, isoprene copolymers, and the mixtures of these elastomers. The synthetic polyisoprenes are preferably synthetic cis-1,4-polyisoprenes. Use is preferably made, among these synthetic polyisoprenes, of polyisoprenes having a molar content of cis-1,4-bonds of greater than 90%, more preferentially still of greater than 98%. Mention will in particular be made, among the various isoprene copolymers, of isobutene/isoprene, isoprene/ethylene, isoprene/styrene, isoprene/butadiene or isoprene/butadiene/styrene copolymers.

The initial polymers, preferably the elastomers, more preferentially the diene elastomers, may have any microstructure which is a function of the polymerization conditions used. These polymers may, for example, be block, random, sequential or microsequential polymers and be prepared in dispersion, in emulsion or in solution. They can be coupled and/or star-branched, for example by means of a silicon or tin atom which connects the polymer chains together.

As seen above, said initial polymer is brought into contact with at least one 1,3-dipolar grafting agent bearing at least one nitrile oxide dipole in the presence of an organophosphorus additive selected from the group consisting of phosphoric acid triesters, phosphonates, phosphinates, phosphine oxides and the mixtures of these compounds.

A “1,3-dipolar grafting agent” is understood to mean a 1,3-dipolar compound capable of carrying out a grafting reaction on a polymer comprising at least one carbon-carbon unsaturation. The 1,3-dipolar compound (or 1,3-dipolar grafting agent) is an electrically neutral chemical compound bearing at least at least one dipole, that is to say a positive and a negative charge in one of their major canonical formulae, and capable of forming a [1,3] dipolar cycloaddition on an unsaturated carbon-carbon bond. For further details, those skilled in the art may refer to the definition given by the IUPAC (International Union of Pure And Applied Chemistry) in the glossary of class names of organic compounds and reactive intermediates based on structure (IUPAC Recommendations 1995, PAC, 1995, 67, 1307).

The 1,3-dipolar grafting agent comprises at least one nitrile oxide dipole capable of reacting with at least one carbon-carbon unsaturation of the initial polymer and at least one chemical function. This chemical function can be any group of atoms which, once grafted to the polymer, makes it possible to modify the chemical and physical properties thereof compared to the non-grafted polymer (initial polymer). As examples of these chemical functions, mention may in particular be made, for example, of those that make it possible to provide good polymer-reinforcing filler interaction when the modified polymer is mixed with reinforcing fillers such as esters, oxazolines, thiazolines, etc.

As 1,3-dipolar grafting agents bearing at least one nitrile oxide dipole that can be used in the context of the present invention, mention may be made of those from documents WO2015059269A1, WO2015177104A1, WO2017009150A1, WO2019102128A1.

More preferentially, the grafting agent may possess, in addition to the nitrile oxide dipole, a chemical function; it being possible for this chemical function to be selected from the group consisting of a hydrocarbon chain, optionally substituted nitrogen-containing or sulfur-containing heterocycles, esters, substituted or unsubstituted oxiranes, carbonates and tertiary amines.

The hydrocarbon chain may optionally contain a heteroatom. It may be linear, cyclic or branched; optionally interrupted by at least one heteroatom, and/or in which at least one hydrogen atom borne by a carbon atom has been substituted by a heteroatom. Preferably, the hydrocarbon chain comprises from 1 to 24 carbon atoms.

Among the nitrogen-containing or sulfur-containing heterocycles, those comprising 5 to 6 members may be especially suitable. They may be saturated or unsaturated and may optionally be substituted by a C1-C20 hydrocarbon group. Preferably, the nitrogen-containing or sulfur-containing heterocycles may be selected from optionally substituted 2H-1,3-oxazoline rings, optionally substituted 2H-1,3-thiazoline rings, optionally substituted 5,6-dihydro-4H-1,3-oxazine rings, optionally substituted 5,6-dihydro-4H-1,3-thiazine rings and optionally substituted imidazole rings, the substituents being those defined above.

Among the esters, those corresponding to the formula C(O)—O—R10, with R10 representing a C1-C20 hydrocarbon group, preferably a C1-C12 hydrocarbon group, more preferably representing a C1-C6 hydrocarbon group, may in particular be suitable. Preferably, R10 is a C1-C6 alkyl, more preferably R10 is a methyl or an ethyl.

Among the tertiary amines, those corresponding to the formula —NR13R14 in which R13 and R14, which may be identical or different, represent a C1-C6 alkyl, may in particular be suitable. Mention may be made, for example, of an N,N-dimethylamino group, an N,N-diethylamino group, or an N-ethyl-N-propylamino group. Preferably, R13 and R14 are identical and are a methyl.

Among the substituted or unsubstituted oxiranes, unsubstituted oxiranes and oxiranes substituted with C1-C6 alkyl or C6-C12 aryl groups may in particular be suitable.

More preferentially still, the 1,3-dipolar grafting agent comprises, in addition to the nitrile oxide dipole, at least one chemical function selected from the group consisting of optionally substituted nitrogen-containing heterocycles, such as substituted or unsubstituted imidazoles or benzoimidazoles, substituted or unsubstituted oxiranes, and carbonates.

More preferentially still, the 1,3-dipolar grafting agent comprises, in addition to the nitrile oxide dipole, at least one chemical function selected from the group consisting of substituted or unsubstituted imidazoles or benzoimidazoles and substituted or unsubstituted oxiranes.

In the remainder of the description and for the sake of brevity and clarity, the 1,3-dipolar grafting agents bearing at least one nitrile oxide dipole and at least one chemical function, defined above, will be denoted by the expression “1,3-dipolar grafting agent” or “1,3-dipolar compounds”.

In the process of the invention, the modification of the polymer by the 1,3-dipolar grafting agent described above is carried out in the presence of at least one organophosphorus additive selected from the group consisting of phosphoric acid triesters, phosphonates, phosphinates, phosphine oxides and the mixtures of these compounds. Surprisingly, the applicant has found that certain organic compounds, notably those containing at least one phosphorus atom and one or more oxygen atoms, made it possible to significantly improve the grafting yield of a 1,3-dipolar grafting agent bearing at least one nitrile oxide dipole onto a polymer comprising at least one carbon-carbon unsaturation, in particular onto a diene elastomer. Surprisingly, the presence of this organophosphorus additive makes it possible to simplify the process by making the heat treatment step of the prior art processes optional.

The term "organophosphorus additive" is understood, for the purposes of the present invention, to mean an organic chemical compound comprising at least one phosphorus atom and at least one oxygen atom. When this compound is brought into contact with the 1,3-dipolar grafting agent and the initial polymer comprising at least one carbon-carbon unsaturation, it promotes the grafting reaction of said 1,3-dipolar grafting agent onto said polymer.

More preferentially, the organophosphorus additive is selected from the group consisting of phosphoric acid tri-esters, phosphonates, phosphinates and the mixtures of these compounds.

These compounds are known and used notably in the fields of construction as mastic or else as flame retardants. They are commercially available from suppliers such as for example ABCR, Sigma-Aldrich and Alfa Chemistry.

More preferentially still, the organophosphorus additive is selected from the group consisting of phosphoric acid tri-esters, phosphonates and the mixtures of these compounds.

More preferentially still, the organophosphorus additive is selected from the group consisting of phosphoric acid tri-esters and the mixtures of these compounds.

Among the grafting additives that can be used within the context of the invention, mention may be made of the compounds of formula (I):

(I)

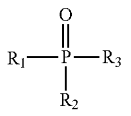

in which:

R1 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls;

R2 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls;

R3 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls.

More preferentially still, the organophosphorus additive is a compound of formula (I):

(I)

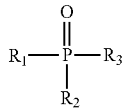

in which:

R1 is selected from the group consisting of C1-C20 alkyls, C6-C20 aryls and O—Ra groups with Ra being a radical selected from the group consisting of C1-C20 alkyls and C6-C20 aryls;

R2 is selected from the group consisting of C1-C20 alkyls, C6-C20 aryls and O—Ra groups with Ra being a radical selected from the group consisting of C1-C20 alkyls and C6-C20 aryls;

R3 is selected from the group consisting of C1-C20 alkyls, C6-C20 aryls and O—Ra groups with Ra being a radical selected from the group consisting of C1-C20 alkyls and C6-C20 aryls.

Among the grafting additives of formula (I), the compounds corresponding to formula (Ia) are particularly preferred. They make it possible to improve the grafting yield of the 1,3-dipolar grafting agent bearing at least one nitrile oxide dipole onto a polymer comprising at least one carbon-carbon unsaturation, in particular onto a diene elastomer. Advantageously, these compounds of formula (Ia) make it possible to obtain very good grafting efficiency at room temperature, in particular at a grafting temperature below or equal to 35° C., more preferentially between 5° C. and 35° C.

Thus, preferentially, the organophosphorus additive corresponds to the formula (Ia):

(Ia)

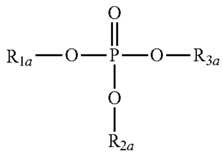

in which R1a, R2a, R3a, which may be identical or different, are selected from the group consisting of C1-C20 alkyls, C6-C20 aryls, (C1-C20)alkyl(C6-C20)aryls and (C6-C20) aryl(C1-C20)alkyls.

Preferentially, in the formula (Ia), R1a, R2a, R3a, which may be identical or different, are selected from the group consisting of C1-C12 alkyls, C6-C12 aryls, (C1-C12)alkyl (C6-C12)aryls and (C6-C12)aryl(C1-C12)alkyls.

More preferentially still, in the formula (Ia), R1a, R2a, R3a, which may be identical or different, are selected from the group consisting of C1-C12 alkyls and C6-C12 aryls.

More preferentially still, the organophosphorus additive is selected from the group consisting of tris(ethylhexyl) phosphate, 2-ethylhexyl diphenyl phosphate, tri-n-octyl phosphate, triisobutyl phosphate and mixtures thereof.

The order that the various starting reagents for carrying out the grafting reaction are brought into contact is not important and the contacting can be carried out by any known means.

According to one preferred embodiment, the 1,3-dipolar grafting agent, the initial polymer and the organophosphorus additive may be brought into contact at the same time as the introduction thereof, for example into a mixer.

According to another embodiment of the invention, these incorporations may also be staggered over time by a few tens of seconds to a few minutes. Thus, preferentially, the organophosphorus additive is brought into contact with the polymer before they are brought into contact with the 1,3-dipolar grafting agent.

According to another preferred embodiment, the organophosphorus additive is brought into contact with the 1,3-dipolar grafting agent before they are brought into contact with the polymer.

The grafting of the 1,3-dipolar grafting agent onto the initial polymer is carried out by [3+2] cycloaddition of the nitrile oxide dipole of said grafting agent onto a carbon-carbon unsaturation of the chain of the initial polymer, this cycloaddition being carried out in the presence of the organophosphorus additive defined above. During this reaction, the nitrile oxide dipole of the 1,3-dipolar grafting agent forms covalent bonds with the chain of the initial polymer. A modified polymer is obtained that bears, along its main chain, distributed randomly along the chain, one or more pendent chemical functions resulting from the grafting reaction of the 1,3-dipolar grafting agent.

Surprisingly, the organophosphorus additive promotes this cycloaddition reaction and therefore the number of 1,3-dipolar grafting agents which will be grafted onto the chain of the initial polymer. Owing to the presence of the organophosphorus additive, the 1,3-dipolar grafting agent may be rapidly and easily grafted onto said initial polymer at a temperature below 35° C. at atmospheric pressure, more preferentially within a range of from 5° C. to 35° C., more preferentially still from 10° C. to 35° C., without it being necessary to carry out a subsequent heat treatment. Furthermore, a very good grafting yield is obtained. "Grafting yield" or "yield" is understood to mean the content, as a molar percentage, of 1,3-dipolar grafting agent grafted onto the chain of the initial polymer, in particular of the diene elastomer, relative to the content, as a molar percentage, of 1,3-dipolar grafting agent introduced as starting reagent. The grafting yield can be determined by conventional polymer analysis methods, for instance $^{1}$H NMR analysis.

According to one particularly preferred embodiment of the process of the invention, steps (a) and (b) are carried out at a temperature below or equal to 35° C., preferably within a range of from 5° C. to 35° C., more preferentially still from 10° C. to 35° C.

According to another embodiment of the invention, the process may further comprise a heat treatment step (a'), after the contacting step (a). Preferentially, the heat treatment step (a') is carried out at a temperature above 35° C., preferably at a temperature above or equal to 36° C., more preferentially still at a temperature within a range of from 36° C. to 180° C., more preferentially ranging from 36° C. to 150° C.

The grafting of the 1,3-dipolar grafting agent, in the presence of the organophosphorus additive, may be carried out in bulk, for example in an internal mixer or an external mixer such as an open mill. It can also be carried out in solution, continuously or batchwise.

According to one embodiment of the invention, the molar content (as a molar percentage (mol %)) of the 1,3-dipolar grafting agent which is brought into contact may be within a range of from 0.01 mol % to 10 mol %, preferably from 0.01 mol % to 5 mol %. The "molar content of the 1,3-dipolar grafting agent" is understood to mean the number of moles of 1,3-dipolar grafting agent grafted per 100 moles of monomer units of the polymer.

According to one embodiment of the invention, the organophosphorus additive is used, at a content greater than or equal to 0.3 parts by weight per hundred parts by weight of polymer (php), more preferentially greater than or equal to 0.4 php, more preferentially still greater than or equal to 0.5 php. More preferentially still, the organophosphorus additive is used at a content within a range of from 0.3 to 30 php, preferably within a range of from 0.4 to 25 php.

Another subject of the present invention is a masterbatch obtained by the process described above.

Another subject of the present invention relates to a masterbatch based on at least one organophosphorus additive, on at least one initial polymer comprising at least one carbon-carbon unsaturation and at least one 1,3-dipolar grafting agent bearing at least one nitrile oxide dipole, said organophosphorus additive being selected from the group consisting of phosphoric acid triesters, phosphonates, phosphinates, phosphine oxides and the mixtures of these compounds.

Another subject of the present invention relates to a masterbatch comprising at least one organophosphorus additive and at least one polymer modified, in the presence of said organophosphorus additive, by a 1,3-dipolar grafting agent bearing at least one nitrile oxide dipole, said organophosphorus additive being selected from the group consisting of phosphoric acid triesters, phosphonates, phosphinates, phosphine oxides and the mixtures of these compounds.

The modified polymer which is a constituent of the masterbatch of the invention and which is obtained by grafting a 1,3-dipolar grafting agent described above, in the presence of said organophosphorus additive, has a molar content of grafted 1,3-dipolar grafting agent greater than that of a modified polymer obtained under the same grafting conditions but without the presence of organophosphorus additive. The masterbatch of the invention, owing to this higher molar content of grafted 1,3-dipolar grafting agent, therefore exhibits different properties compared to a modified polymer obtained under the same grafting conditions, i.e. same conditions for temperature, time, order of addition of the reagents, etc., but without the presence of said organophosphorus additive used within the context of the invention.

The "molar content of grafted 1,3-dipolar grafting agent" is understood for the purposes of the present invention to mean the number of moles of 1,3-dipolar grafting agent grafted per 100 moles of monomer units of the polymer. This molar content may be determined by conventional measurements for characterizing polymers, such as for example NMR.

Preferentially, the masterbatch has a phosphorus content of greater than 600 ppm, preferably ranging from 700 ppm to 55 000 ppm (ppm=parts per million) and the modified polymer constituting it has a molar content of grafted 1,3-dipolar grafting agent greater than the molar content of 1,3-dipolar grafting agent of a modified polymer obtained under the same grafting conditions but without the presence of organophosphorus additive.

The phosphorus content is determined by inductively coupled plasma atomic emission spectroscopy (ICP-AES) according to the method described below.

Preferentially, the modified polymer of the masterbatch is the one which has been described above. Preferentially, the modified polymer is an elastomer, preferably a diene elastomer. More preferentially still, the modified polymer is selected from the group consisting of natural rubber, synthetic polyisoprenes, polybutadienes, butadiene copolymers, isoprene copolymers and the mixtures of these polymers.

The 1,3-dipolar grafting agent bearing at least one nitrile oxide dipole and at least one chemical function of the masterbatch and the organophosphorus additive of the masterbatch are those which have been described above, including the preferred embodiments thereof Preferentially, the organophosphorus additive is a compound of formula (I) described above, including the preferred forms thereof. More preferentially still, the organophosphorus additive corresponds to the formula (Ia) described above, including the preferred embodiments thereof.

Another subject of the present invention is a composition based on at least one masterbatch defined above or capable of being obtained by the process of the invention. The composition may preferentially further comprise any additive known to a person skilled in the art, such as a reinforcing or non-reinforcing filler, a dye, an antioxidant, resins, flame retardants, lubricants, etc.

Another subject of the present invention relates to a rubber composition based on at least one masterbatch defined above or capable of being obtained according to the process described above, on at least one reinforcing filler and on at least one crosslinking system.

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the non-crosslinked state.

A filler is understood here to mean any type of filler, whether it is reinforcing or whether it is non-reinforcing or inert.

According to one embodiment, the rubber composition of the invention may comprise one or more reinforcing fillers.

Use may be made of any type of "reinforcing" filler known for its abilities to reinforce a rubber composition which can be used in particular in the manufacture of tyres, for example an organic filler, such as carbon black, an inorganic filler, such as silica, or else a mixture of these two types of fillers.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 or N772 blacks. These carbon blacks can be used in the isolated state, as commercially available, or in any other form, for example as support for some of the rubber additives used.

"Reinforcing inorganic filler" should be understood here as meaning any inorganic or mineral filler, whatever its colour and its origin (natural or synthetic), also known as "white" filler, "clear" filler or even "non-black" filler, in contrast to carbon black, which is capable of reinforcing by itself alone, without means other than an intermediate coupling agent, a rubber composition intended for the manufacture of tyres. In a known manner, certain reinforcing inorganic fillers can be characterized in particular by the presence of hydroxyl groups (—OH) on their surface.

Mineral fillers of the siliceous type, preferentially silica ($SiO_2$), or of the aluminous type, especially alumina ($Al_2O_3$), are suitable in particular as reinforcing inorganic fillers. The silica used can be any reinforcing silica known to those skilled in the art, in particular any precipitated or fumed silica exhibiting a BET specific surface area and a CTAB specific surface area both of less than 450 $m^2/g$, preferably within a range extending from 30 to 400 $m^2/g$, in particular from 60 to 300 $m^2/g$.

In the present account, the BET specific surface area of the inorganic filler, such as silica for example, is determined by gas adsorption using the Brunauer-Emmett-Teller method described in "The Journal of the American Chemical Society" (vol. 60, page 309, February 1938), and more specifically according to a method adapted from standard NF ISO 5794-1, Appendix E, of June 2010 [multipoint (5 point) volumetric method—gas: nitrogen—degassing under vacuum: one hour at 160° C.—relative pressure p/po range: 0.05 to 0.17]. For the inorganic fillers, such as silica, for example, the CTAB specific surface area values were determined according to Standard NF ISO 5794-1, Appendix G, of June 2010. The process is based on the adsorption of CTAB (N-hexadecyl-N,N,N-trimethylammonium bromide) on the "external" surface of the reinforcing filler.

Any type of precipitated silica, in particular highly dispersible precipitated silicas (referred to as "HDS" for "highly dispersible" or "highly dispersible silica"), can be used. These precipitated silicas, which are or are not highly dispersible, are well known to a person skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silicas, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

The physical state in which the reinforcing inorganic filler is provided is not important, whether it is in the form of a powder, of micropearls, of granules, or else of beads or any other appropriate densified form. Of course, reinforcing inorganic filler is also understood to mean mixtures of different reinforcing inorganic fillers, in particular of silicas as described above.

A person skilled in the art will understand that, as replacement for the reinforcing inorganic filler described above, use might be made of a reinforcing filler of another nature, provided that this reinforcing filler of another nature is covered with an inorganic layer, such as silica, or else comprises functional sites, in particular hydroxyl sites, at its surface which require the use of a coupling agent in order to establish the bond between this reinforcing filler and the diene elastomer. By way of example, mention may be made of carbon blacks partially or completely covered with silica, or carbon blacks modified by silica, such as, without limitation, the fillers of Ecoblack® type of the CRX2000 series or of the CRX4000 series from Cabot Corporation.

In order to couple the reinforcing inorganic filler to the diene elastomer, use may be made, in a well-known manner, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. "Bifunctional" is understood to mean a compound having a first functional group capable of interacting with the inorganic filler and a second functional group capable of interacting with the diene elastomer. For example, such a bifunctional compound can comprise a first functional group comprising a silicon atom, the said first functional group being capable of interacting with the hydroxyl groups of an inorganic filler, and a second functional group comprising a sulfur atom, the said second functional group being capable of interacting with the diene elastomer.

Preferably, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

The composition may preferentially further comprise, in addition a crosslinking system.

The crosslinking system can be any type of system known to a person skilled in the art in the field of tyre rubber compositions. It may in particular be based on sulfur, and/or on peroxide and/or on bismaleimides.

Preferentially, the crosslinking system is based on sulfur; it is then called a vulcanization system. The sulfur can be provided in any form, in particular in the form of molecular sulfur, or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or else known vulcanization retarders.

The sulfur is used at a preferential content of between 0.5 and 12 phr, in particular between 1 and 10 phr. The vulcanization accelerator is used at a preferential content of between 0.5 and 10 phr, more preferentially of between 0.5 and 5.0 phr.

Use may be made, as accelerator, of any compound capable of acting as accelerator of the vulcanization of diene elastomers in the presence of sulfur, in particular accelerators of the thiazole type, and also derivatives thereof, or accelerators of sulfenamide, thiuram, dithiocarbamate, dithiophosphate, thiourea and xanthate types. As examples of such accelerators, mention may in particular be made of the following compounds: 2-mercaptobenzothiazyl disulfide (abbreviated to "MBTS"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

The rubber composition in accordance with the invention may also comprise all or some of the usual additives and processing aids known to a person skilled in the art and customarily used in compositions, notably in rubber compositions for tyres, in particular treads, such as for example plasticizers (such as plasticizing oils and/or plasticizing resins), pigments, protective agents, such as antiozone waxes, chemical antiozonants, antioxidants, anti-fatigue agents or reinforcing resins (as described, for example, in application WO 02/10269).

The rubber composition in accordance with the invention can be manufactured in appropriate mixers using two successive preparation phases well known to a person skilled in the art:

a first phase of thermomechanical working or kneading ("non-productive" phase), which can be carried out in a single thermomechanical stage during which all the necessary constituents, in particular the masterbatch in accordance with the invention, the fillers and the optional other various additives, with the exception of the crosslinking system, are introduced into an appropriate mixer, such as a standard internal mixer (for example of "Banbury" type). The filler can be incorporated into the masterbatch in one or more portions by thermomechanically kneading. The non-productive phase can be carried out at high temperature, up to a maximum temperature of between 110° C. and 200° C., preferably between 130° C. and 185° C., for a period of time generally of between 2 and 10 minutes;

a second phase of mechanical working ("productive" phase), which is carried out in an external mixer, such as an open mill, after cooling the mixture obtained during the first non-productive phase to a lower temperature, typically below 120° C., for example between 40° C. and 100° C. The crosslinking system is then incorporated and the combined mixture is then mixed for a few minutes, for example between 5 and 15 minutes.

The final rubber composition thus obtained may be subsequently calendered, for example in the form of a sheet or slab, notably for laboratory characterization, or else extruded in the form of a rubber semi-finished product (or profiled element) which can be used, for example, as a tread in a pneumatic or non-pneumatic tyre.

The rubber composition may be either in the uncured state (before crosslinking or vulcanization) or in the cured state (after crosslinking or vulcanization), and may be a semi-finished product which can be used in a pneumatic or non-pneumatic tyre.

The crosslinking of the composition can be carried out in a way known to a person skilled in the art, for example at a temperature of between 80° C. and 200° C., under pressure.

Another subject of the present invention relates to an article, notably a rubber article, comprising at least one composition, notably rubber composition, as defined above. The rubber article may be any type of article such as a hose, tubing, a gasket, an O-ring, a drive belt, an engine mount, an antivibration system, a window profiled element, a car window or body sealing profiled element, insulation for electrical cables, a shoe sole, a rubber mat, a conveyor belt, a semi-finished article for a pneumatic or non-pneumatic tyre, or a pneumatic or non-pneumatic tyre.

The semi-finished products for a pneumatic or non-pneumatic tyre are rubber products intended for the manufacture of a pneumatic or non-pneumatic tyre. This may be any type of rubber strip, such as especially treads, underlayers, crown reinforcement plies (for example working plies, protection plies or hooping plies), carcass reinforcement plies, sidewall plies, bead plies, protector plies, underlayer plies, rubber block plies and other plies providing the interface between the abovementioned regions of the tyres. Preferably, the semi-finished article is a tread.

Another subject of the present invention relates to a pneumatic or non-pneumatic tyre comprising at least one rubber composition as defined above.

A pneumatic tyre is understood to mean a tyre intended to form a cavity in collaboration with a support element, for example a rim, this cavity being able to be pressurized to a pressure higher than atmospheric pressure. In contrast, a non-pneumatic tyre is not able to be pressurized. Thus, a non-pneumatic tyre is a toric body made up of at least one polymer material, intended to perform the function of a tyre but without being subjected to an inflation pressure. A non-pneumatic tyre may be solid or hollow. A hollow non-pneumatic tyre may contain air, but at atmospheric pressure, which is to say that it has no pneumatic stiffness afforded by an inflation gas at a pressure higher than atmospheric pressure.

The pneumatic or non-pneumatic tyres according to the invention are intended to be fitted to vehicles of any type such as passenger vehicles, two wheeled vehicles, heavy-duty vehicles, agricultural vehicles, construction plant vehicles or aircraft or, more generally, on any rolling device.

5—EXAMPLES

The examples which follow make it possible to illustrate the invention; however, the invention cannot be limited to these examples alone.

5.1—Test and Measurements Used

5.1.1 Characterizations of the Molar Content of Grafted 1,3-Dipolar Grafting Agents The determination of the molar content of the grafted 1,3-dipolar grafting agent is carried out by an NMR analysis. The spectra are acquired on a "500 MHz Bruker" spectrometer equipped with a "5 mm BBFO Z-grad CryoProbe". The quantitative $^1H$ NMR experiment uses a simple 30° pulse sequence and a repetition time of 5 seconds between each acquisition. The samples are dissolved in deuterated chloroform ($CDCl_3$) with the aim of obtaining a "lock" signal.

5.1.2: Synthesis of the 1,3-Dipolar Grafting Agent: 2-(2-Oxiranylmethoxy)-1-Naphthonitrile Oxide The 2-(2-oxiranylmethoxy)-1-naphthonitrile oxide, also referred to as 2-(glycidyloxy)-1-naphthonitrile, is synthesized in accordance with the protocol described in example 1 of application US20120046418.

5.1.3: Organophosphorus Additive

The organophosphorus additive tris(ethylhexyl) phosphate is sold by Sigma Aldrich under the reference 289922-25ML.

The organophosphorus additive 2-ethylhexyl diphenyl phosphate is sold by VWR under the reference EHERC13342300.

The organophosphorus additive triisobutyl phosphate is sold by Alfa Chemistry (CAS number: 126-71-6)

5.1.4: Measurement of the Phosphorus Content

The determination of the phosphorus content in the masterbatch or in the modified polymers of the prior art is carried out by inductively coupled plasma atomic emission spectroscopy (ICP-AES). The spectra are acquired on an Arcos spectrometer from Spectro Ametek. The samples are dissolved by acid mineralization (80/20 vol/vol concentrated nitric acid/concentrated hydrochloric acid mixture) at 130° C., in a sealed test tube. The solutions obtained are then analysed by ICP-AES at $\lambda$=178.287 nm.

5.2: Test No. 1

The purpose of this test is to demonstrate the advantage that the process for preparing a masterbatch according to the invention provides compared to a process not in accordance with the invention for preparing a modified elastomer by grafting of a 1,3-dipolar grafting agent.

For this, the grafting of the 1,3-dipolar grafting agent bearing a nitrile oxide, 2-(2-oxiranylmethoxy)-1-naphthonitrile oxide, is carried out on a synthetic polyisoprene in the presence (process according to the invention) or absence (prior art process) of an organophosphorus additive. The grafting additives tested are:

Additive A: tris(ethylhexyl) phosphate;

Additive B: 2-ethylhexyl diphenyl phosphate and

Additive C: triisobutyl phosphate.

The elastomer used is a synthetic polyisoprene used has an Mn=375 000 g/mol and an Ip=3.6.

The process for preparing the modified polymer not in accordance with the invention (Example 1) is carried out in the following manner:

Introduced simultaneously, onto a roll mill at 23° C., are 15 g of the synthetic polyisoprene (IR) described above, 0.26 g of the grafting agent described above (i.e. 0.5 mol of grafting agent per 100 mol of constituent repeating units of the synthetic polyisoprene).

The mixture is homogenized in 15 turnover passes. The entire process takes place at room temperature at 23° C.; no heat treatment step is performed. The modified polymer is then recovered in order to determine the grafting yields by $^1H$ NMR analysis. The results are collated in Table 1.

The process for preparing the masterbatch in accordance with the invention (Examples 2, 3 and 4) is carried out in the following manner:

Introduced simultaneously, onto a roll mill at 23° C., are 15 g of the synthetic polyisoprene (IR) described above, 0.26 g of the grafting agent described above (i.e. 0.5 mol of grafting agent per 100 mol of constituent repeating units of the synthetic polyisoprene) and 1.5 g, i.e. 10 phr, of the organophosphorus additive to be tested.

The mixture is homogenized in 15 turnover passes. The entire process takes place at room temperature at 23° C.; no heat treatment step is performed. The masterbatch is then recovered in order to determine the grafting yields by $^1H$ NMR analysis. The results are collated in Table 1.

TABLE 1

| No. | Nature of the organophosphorus additive | Amount of organophosphorus additive introduced (in phr) | Amount of 1,3-dipolar grafting agent introduced (in mol %) | Target degree of grafting (in mol %) | Degree of grafting obtained (in mol %) | Grafting yield (in %) | Phosphorus content (in phr) |
|---|---|---|---|---|---|---|---|
| 1 | (—) | 0 | 0.5 | 0.5 | 0.18 | 36 | <4 |
| 2 | Additive A | 10 | 0.5 | 0.5 | 0.35 | 70 | 6700 |
| 3 | Additive B | 10 | 0.5 | 0.5 | 0.28 | 56 | 8030 |
| 4 | Additive C | 10 | 0.5 | 0.5 | 0.42 | 84 | 10900 |

In light of Table 1, a significant increase in the grafting yield of the 1,3-dipolar grafting agent onto the synthetic polyisoprene is observed when the 1,3-dipolar grafting agent is brought into contact with the synthetic polyisoprene in the presence of an organophosphorus additive, regardless of the chemical nature of the organophosphorus additive used. This increase is 55% for the grafting of the 1,3-dipolar compound in the presence of 2-ethylhexyl diphenyl phosphate compared to the grafting of the same compound without grafting agent (comparison of no. 3 with no. 1), 94% for the grafting of the 1,3-dipolar compound in the presence of tris(ethylhexyl) phosphate (comparison of no. 2 with no. 1) and 133% in the presence of triisobutyl phosphate (comparison of no. 4 with no. 1).

5.3: Test No. 2

The purpose of this test is to demonstrate the advantage that the process for preparing a masterbatch according to the invention provides, as a function of the various contents of organophosphorus additives tested, compared to a process not in accordance with the invention for preparing a modified elastomer by grafting of a 1,3-dipolar grafting agent. The tested contents of organophosphorus additives are 0.5 phr, 1 phr, 2 phr, 5 phr, 10 phr and 20 phr.

The organophosphorus additive is tris(ethylhexyl) phosphate; the grafting agent is 2-(2-oxiranylmethoxy)-1-naphthonitrile oxide, the polymer is the synthetic polyisoprene described above.

The process for preparing the modified polymer not in accordance with the invention (Example 5) and the process for preparing the masterbatch according to the invention (Examples 6, 7, 8 and 9) are carried out in accordance with test 1 but with a different amount of organophosphorus additive ranging from 0.075 g to 3 g (i.e. from 0.5 phr to 20 phr). The results are collated in Table 2.

TABLE 2

| No. | Amount of organophosphorus additive introduced (in phr) | Amount of 1,3-dipolar grafting agent introduced (in mol %) | Target degree of grafting (in mol %) | Degree of grafting obtained (in mol %) | Grafting yield (%) | Phosphorus content in ppm |
|---|---|---|---|---|---|---|
| 5 | 0 | 0.5 | 0.5 | 0.18 | 36 | <4 |
| 6 | 0.5 | 0.5 | 0.5 | 0.19 | 38 | 367 |
| 7 | 1 | 0.5 | 0.5 | 0.25 | 50 | 730 |
| 8 | 2 | 0.5 | 0.5 | 0.25 | 50 | 1455 |
| 9 | 5 | 0.5 | 0.5 | 0.30 | 60 | 3511 |
| 10 | 10 | 0.5 | 0.5 | 0.35 | 70 | 6700 |
| 11 | 20 | 0.5 | 0.5 | 0.37 | 74 | 12288 |

In light of Table 4, it is observed that the increase in the grafting yield of the process for manufacturing a masterbatch according to the invention is dependent on the amount of organophosphorus additive used during this process.

5.4: Test No. 3

The purpose of this test is to demonstrate the improvement in the grafting yield of a process for manufacturing a masterbatch according to the invention compared to the process for modifying a polymer not in accordance with the invention when this modification process comprises a heat treatment step (prior art process).

The organophosphorus additive is tris(ethylhexyl) phosphate; the grafting agent is 2-(2-oxiranylmethoxy)-1-naphthonitrile oxide, the polymer is the synthetic polyisoprene described above.

The process for preparing the modified polymer is carried out in the following manner (process not in accordance with the invention, example 12):

Introduced simultaneously, onto a roll mill at 23° C., are 15 g of the synthetic polyisoprene (IR) and 0.26 g of 1,3-dipolar grafting agent (i.e. 0.5 mol of grafting agent per 100 mol of constituent repeating units of the synthetic polyisoprene). The mixture is homogenized in 15 turnover passes at room temperature at 23° C. Next, a heat treatment is carried out at 120° C. for 10 min in a press at 10 bar of pressure. The modified polymer is then recovered in order to determine the grafting yields by $^{1}H$ NMR analyses. The results are collated in Table 3.

The process for preparing the masterbatch according to the invention is carried out in the following manner (examples 13 to 18):

Introduced simultaneously, onto a roll mill at 23° C., are the organophosphorus additive at the content indicated in Table 3, 15 g of the synthetic polyisoprene (IR) and 0.26 g of 1,3-dipolar grafting agent (i.e. 0.5 mol of grafting agent per 100 mol of constituent repeating units of the synthetic polyisoprene). The mixture is homogenized in 15 turnover passes at room temperature at 23° C. Next, a heat treatment is carried out at 120° C. for 10 min in a press at 10 bar of pressure. The masterbatch is then recovered in order to determine the grafting yields by $^{1}H$ NMR analysis. The results are collated in Table 3.

TABLE 3

| No. | Amount of organophosphorus additive introduced (in phr) | Amount of 1,3-dipolar grafting agent introduced (in mol %) | Target degree of grafting (in mol %) | Degree of grafting obtained (in mol %) in the absence of heat treatment | Grafting yield (in %) in the absence of heat treatment | Degree of grafting obtained (in mol %) with a heat treatment | Grafting yield (in %) with a heat treatment | Phosphorus content (in ppm) |
|---|---|---|---|---|---|---|---|---|
| 12 | 0 | 0.5 | 0.5 | 0.18 | 36 | 0.31 | 62 | <4 |
| 13 | 0.5 | 0.5 | 0.5 | 0.19 | 38 | 0.34 | 68 | 367 |
| 14 | 1 | 0.5 | 0.5 | 0.25 | 50 | 0.39 | 78 | 730 |
| 15 | 2 | 0.5 | 0.5 | 0.25 | 50 | 0.4 | 80 | 1445 |
| 16 | 5 | 0.5 | 0.5 | 0.30 | 60 | 0.39 | 78 | 3511 |
| 17 | 10 | 0.5 | 0.5 | 0.35 | 70 | 0.38 | 76 | 6700 |
| 18 | 20 | 0.5 | 0.5 | 0.37 | 74 | 0.4 | 80 | 12288 |

From Table 3, it is observed that in the absence of grafting agent, the heat treatment step makes it possible to increase the grafting yield of the 1,3-dipolar grafting agent by 72% (see no. 12 where the grafting yield is 62% with the heat treatment step versus 36% in the absence of the heat treatment step).

The same level of increase in grafting yield (i.e. a yield of about 62%) is obtained without heat treatment when at least 5 phr of organophosphorus additive is used (see no. 16).

The addition of a heat treatment step to the process for manufacturing a masterbatch according to the invention makes it possible to further increase the grafting yield of the 1,3-dipolar grafting agent, which is already significantly high given the presence of the organophosphorus additive.

The same tests as above are reproduced with a content of 1,3-dipolar grafting agent introduced of 0.5 mol % but with different organophosphorus additives used. The results are collated in Table 4.

TABLE 4

| No. | Organophosphorus additive | Content of organophosphorus additive (in phr) | Amount of 1,3-dipolar compound introduced (in mol %) | Target degree of grafting (in mol %) | Degree of grafting obtained (in mol %) without heat treatment | Grafting yield (in %) without heat treatment | Degree of grafting obtained (in mol %) with a heat treatment | Grafting yield (in %) with heat treatment |
|---|---|---|---|---|---|---|---|---|
| 19 | (—) | 0 | 0.5 | 0.5 | 0.18 | 36 | 0.31 | 62 |
| 20 | Additive A | 10 | 0.5 | 0.5 | 0.35 | 70 | 0.38 | 76 |
| 21 | Additive B | 10 | 0.5 | 0.5 | 0.28 | 56 | 0.33 | 66 |
| 22 | Additive C | 10 | 0.5 | 0.5 | 0.42 | 84 | 0.45 | 90 |

Additive A: tris(ethylhexyl) phosphate
Additive B: 2-ethylhexyl diphenyl phosphate
Additive C: triisobutyl phosphate Table 4 shows that, regardless of the organophosphorus additive used in the process for manufacturing a masterbatch according to the invention, a significant improvement in the grafting yield, already high due to the presence of the organophosphorus additive, is observed when an additional heat treatment step is carried out.

5.5: Test No. 4

The purpose of this test is to demonstrate the improvement in the yield of a process for manufacturing a masterbatch according to the invention, regardless of the amount of 1,3-dipolar grafting agent introduced, compared to a process not in accordance with the invention and comprising a heat treatment step (prior art process). For this, various degrees of grafting (0.5 mol %, 1 mol % and 2 mol %) are targeted with a constant content of organophosphorus additive (10 phr).

The organophosphorus additive is tris(ethylhexyl) phosphate; the grafting agent is 2-(2-oxiranylmethoxy)-1-naphthonitrile oxide, the polymer is the synthetic polyisoprene described above.

The procedure of test no. 3 is followed. Either the modified polymer or the masterbatch is then recovered in order to determine the grafting yields by $^1H$ NMR analyses. The results are collated in Table 5.

TABLE 5

| No. | Amount of organophosphorus additive introduced (in phr) | Amount of 1,3-dipolar grafting agent introduced (in mol %) | Target degree of grafting (in mol %) | Degree of grafting obtained (in mol %) after a heat treatment | Grafting yield (in %) after a heat treatment |
|---|---|---|---|---|---|
| 23 | 0 | 0.5 | 0.5 | 0.31 | 62 |
| 24 | 10 | 0.5 | 0.5 | 0.38 | 76 |
| 25 | 0 | 1 | 1 | 0.43 | 43 |
| 26 | 10 | 1 | 1 | 0.71 | 71 |
| 27 | 0 | 2 | 2 | 0.92 | 46 |
| 28 | 10 | 2 | 2 | 1.4 | 70 |

In light of Table 5, regardless of the target degree of grafting (0.5%; 1% or 2%) of the 1,3-dipolar grafting agent onto the polymer, an increase in the grafting yield is observed when the grafting reaction is carried out in the presence of the organophosphorus additive, in accordance with the process of the invention.

5.6: Test No. 5

The purpose of this test is to demonstrate the improvement in the yield of a process for manufacturing a masterbatch according to the invention, regardless of the nature of the polymer used.

For this, the various polymers tested are:

a synthetic polyisoprene (IR) having Mn=375 000 g/mol and an Ip=3.6 as polymer a styrene/butadiene copolymer (SBR) containing 26.5% by weight of styrene relative to the total weight of the copolymer and 24% by weight of 1,2-butadiene units relative to the weight of the butadiene part, 28% by weight of cis-1,4-butadiene units relative to the weight of the butadiene part and 48% by weight of trans-1,4-butadiene units relative to the weight of the butadiene part; Mn=120 000 g/mol and Ip=1.22;

natural rubber (NR).

In this test, use is made of tris(ethylhexyl) phosphate as organophosphorus additive and of 2-(2-oxiranylmethoxy)-1-naphthonitrile oxide as described above as 1,3-dipolar grafting agent.

The procedure of test no. 1 is followed. The entire process takes place at room temperature at 23° C.; no heat treatment step is performed.

The modified polymer or the masterbatch is then recovered in order to determine the grafting yields by $^1$H NMR analyses. The results are collated in Table 6.

TABLE 6

| No. | Polymer | Amount of organophosphorus additive introduced (in phr) | Amount of 1,3-dipolar grafting agent introduced (in mol %) | Target degree of grafting (in mol %) | Degree of grafting obtained (in mol %) | Grafting yield (in %) |
|---|---|---|---|---|---|---|
| 29 | IR | 0 | 0.5 | 0.5 | 0.18 | 36 |
| 30 | IR | 10 | 0.5 | 0.5 | 0.35 | 70 |
| 31 | SBR | 0 | 0.5 | 0.5 | 0.37 | 74 |
| 32 | SBR | 10 | 0.5 | 0.5 | 0.47 | 94 |
| 33 | NR | 0 | 0.5 | 0.5 | 0.19 | 38 |
| 34 | NR | 10 | 0.5 | 0.5 | 0.32 | 64 |

In view of Table 6, it is that observed that, regardless of the nature of the polymer used, a significant increase in the grafting yield of the 1,3-dipolar grafting agent is always obtained in the presence of the organophosphorus additive. This increase in grafting is higher for natural rubber and synthetic polyisoprene (increase of 68% and 94% respectively) than for the styrene/butadiene copolymer (29%).

The invention claimed is:

1. A process for manufacturing a masterbatch comprising the following steps:

(a) bringing an initial polymer comprising at least one carbon-carbon unsaturation into contact with at least one 1,3-dipolar grafting agent bearing at least one nitrile oxide dipole in the presence of at least one organophosphorus additive selected from the group consisting of phosphoric acid triesters, phosphonates, phosphinates, phosphine oxides and mixtures thereof to obtain the masterbatch; and (b) recovering the masterbatch obtained in step (a), wherein the at least one organophosphorus additive is in a range of from 0.3 phr to 20 phr, wherein the masterbatch has a phosphorous content of greater than 600 ppm, and wherein the initial polymer is a diene elastomer selected from the group consisting of natural rubber, synthetic polyisoprenes, polybutadienes, isoprene copolymers, and styrene/butadiene copolymers (SBR), and wherein the masterbatch consists of the initial polymer, the at least one 1,3-dipolar grafting agent, and the at least one organophosphorus additive.

2. The process for manufacturing a masterbatch according to claim 1, wherein steps (a) and (b) are carried out at a temperature below or equal to 35° C.

3. The process for manufacturing a masterbatch according to claim 1, wherein the process further comprises a heat treatment step (a'), after step (a).

4. The process for preparing for manufacturing a masterbatch according claim 1, wherein the at least one organophosphorous additive corresponds to formula (I):

(I)

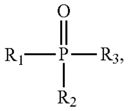

in which:

R1 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls;

R2 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls; and R3 is selected from the group consisting of C1-C20 alkyls, C6-C20 aryls, (C1-C20)alkyl(C6-C20)aryls, (C6-C20)aryl(C1-C20)alkyls and O—Ra groups with Ra being a radical selected from the group consisting of C1-C20 alkyls, C6-C20 aryls, (C1-C20)alkyl(C6-C20) aryls and (C6-C20)aryl(C1-C20)alkyls.

5. The process for manufacturing a masterbatch according to claim 1, wherein the at least one organophosphorous additive corresponds to formula (Ia):

(Ia)

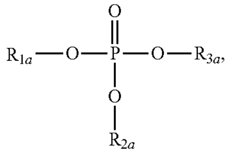

in which R1a, R2a, and R3a, which may be identical or different, are selected from the group consisting of C1-C20 alkyls, C6-C20 aryls, (C1-C20)alkyl(C6-C20)aryls and (C6-C20)aryl(C1-C20)alkyls.

6. The process for manufacturing a masterbatch according to claim 5, wherein R1a, R2a, and R3a, which may be identical or different, are selected from the group consisting of C1-C12 alkyls, C6-C12 aryls, (C1-C12)alkyl(C6-C12) aryls and (C6-C12)aryl(C1-C12)alkyls.

7. The process for preparing for manufacturing a masterbatch according to claim 5, wherein R1a, R2a, and R3a, which may be identical or different, are selected from the group consisting of C1-C12 alkyls and C6-C12 aryls.

8. The process for manufacturing a masterbatch according to claim 1, wherein the at least one organophosphorous additive is selected from the group consisting of tris(ethylhexyl) phosphate, 2-ethylhexyl diphenyl phosphate, tri-n-octyl phosphate, triisobutyl phosphate and mixtures thereof.

9. The process for manufacturing a masterbatch according to claim 1, wherein the at least one 1,3-dipolar grafting agent comprises, in addition to the at least one nitrile oxide dipole, at least one chemical function selected from the group consisting of optionally substituted nitrogen-containing or sulfur-containing heterocycles, esters, oxiranes, carbonates and tertiary amines.

10. A masterbatch based on at least one organophosphorus additive, on an initial polymer comprising at least one carbon-carbon unsaturation and at least one 1,3-dipolar grafting agent bearing at least one nitrile oxide dipole, the at least one organophosphorus additive being selected from the group consisting of phosphoric acid triesters, phosphonates, phosphinates, phosphine oxides and mixtures thereof, wherein the at least one organophosphorus additive is in a range of from 0.3 phr to 20 phr, wherein the masterbatch has a phosphorous content of greater than 600 ppm, wherein the initial polymer is a diene elastomer selected from the group consisting of natural rubber, synthetic polyisoprenes, polybutadienes, isoprene copolymers, and styrene/butadiene copolymers (SBR), and wherein the masterbatch consists of the initial polymer, the at least one 1,3-dipolar grafting agent, and the at least one organophosphorus additive.

11. A composition comprising at least one masterbatch according to claim 10.

12. An article comprising at least one composition according to claim 11.

13. A pneumatic or non-pneumatic tire comprising at least one composition according to claim 11.

14. A composition comprising at least one masterbatch obtained according to the process according to claim 1.

15. An article comprising at least one composition according to claim 14.

16. A pneumatic or non-pneumatic tire comprising at least one composition according to claim 14.

* * * * *